(12) United States Patent
Cruanes et al.

(10) Patent No.: US 12,730,810 B2
(45) **Date of Patent: *Sep. 8, 2026**

(54) INTERLEAVED EXECUTION INFRASTRUCTURE IN DATABASE ENGINES

(71) Applicant: Snowflake Inc., Bozeman, MT (US)

(72) Inventors: Thierry Cruanes, San Mateo, CA (US); Benoit Dageville, San Mateo, CA (US); Igor Demura, Mountain View, CA (US); Brian Charles Forney, Mountain View, CA (US); Weili Gu, Sunnyvale, CA (US); Yujie Li, Santa Clara, CA (US); Mohammad Saber Mirzaei, Seattle, WA (US); Jaeyun Noh, Sunnyvale, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,419

(22) Filed: Dec. 19, 2024

(65) Prior Publication Data

US 2025/0117387 A1 Apr. 10, 2025

Related U.S. Application Data

(63) Continuation of application No. 18/162,486, filed on Jan. 31, 2023, now Pat. No. 12,210,525.

(51) Int. Cl.
*G06F 16/24* (2019.01)
*G06F 16/2453* (2019.01)

(52) U.S. Cl.
CPC .. *G06F 16/24542* (2019.01); *G06F 16/24532* (2019.01); *G06F 16/2454* (2019.01)

(58) Field of Classification Search
CPC .................................................. G06F 16/24542
See application file for complete search history.

(56) References Cited

U.S. PATENT DOCUMENTS

| | | | |
|---|---|---|---|
| 9,836,504 B2 | 12/2017 | Graefe et al. | |
| 10,936,589 B1 | 3/2021 | Beitchman et al. | |
| 11,194,815 B1 | 12/2021 | Kumar et al. | |
| 11,829,363 B2 | 11/2023 | Freedman et al. | |
| 2011/0228668 A1 | 9/2011 | Pillai et al. | |
| 2018/0121505 A1* | 5/2018 | Barsness | G06F 16/24542 |
| 2018/0165610 A1 | 6/2018 | Dumant et al. | |

(Continued)

OTHER PUBLICATIONS

"U.S. Appl. No. 18/162,486, Final Office Action mailed Jun. 10, 2024", 17 pgs.
"U.S. Appl. No. 18/162,486, Final Office Action mailed Aug. 22, 2023", 18 pgs.

(Continued)

*Primary Examiner* — Mohammad S Rostami
(74) *Attorney, Agent, or Firm* — Schwegman Lundberg & Woessner, P.A.

(57) ABSTRACT

Interleaved infrastructure can interleave fragment execution during query compilation. For example, compilation can be paused, and a plan fragment is executed. The results of the plan fragment can be fed back into the compiler, which can then restart the compilation and modify the compilation based on the results of the plan fragment execution. The interleaved workflow provides a flexible, robust infrastructure, which can enable and improve a variety of database features and query optimizations.

14 Claims, 7 Drawing Sheets

(56) References Cited

U.S. PATENT DOCUMENTS

| | | | | |
|---|---|---|---|---|
| 2019/0236202 | A1* | 8/2019 | Guney | G06F 16/9535 |
| 2020/0110827 | A1* | 4/2020 | Freedman | G06F 16/24535 |
| 2020/0278960 | A1 | 9/2020 | Rintanen | |
| 2020/0334231 | A1 | 10/2020 | Muralidhar et al. | |
| 2020/0334241 | A1 | 10/2020 | Muralidhar et al. | |
| 2021/0263929 | A1* | 8/2021 | Chen | G06F 16/24539 |
| 2021/0365456 | A1* | 11/2021 | Kondiles | G06F 16/2462 |
| 2021/0374135 | A1* | 12/2021 | Cruanes | G06F 16/24539 |
| 2021/0374136 | A1* | 12/2021 | Cruanes | G06F 16/162 |
| 2022/0114155 | A1 | 4/2022 | Dhuse et al. | |
| 2022/0138168 | A1 | 5/2022 | Veselova et al. | |
| 2023/0385277 | A1 | 11/2023 | Schmidt et al. | |
| 2024/0256540 | A1 | 8/2024 | Cruanes et al. | |

OTHER PUBLICATIONS

"U.S. Appl. No. 18/162,486, Non Final Office Action mailed Apr. 11, 2023", 17 pgs.
"U.S. Appl. No. 18/162,486, Non Final Office Action mailed Dec. 7, 2023", 23 pgs.
"U.S. Appl. No. 18/162,486, Notice of Allowance mailed Sep. 24, 2024", 9 pgs.
"U.S. Appl. No. 18/162,486, Response filed Mar. 7, 2024 to Non Final Office Action mailed Dec. 7, 2023", 15 pgs.
"U.S. Appl. No. 18/162,486, Response filed Jul. 11, 2023 to Non Final Office Action mailed Apr. 11, 2023", 13 pgs.
"U.S. Appl. No. 18/162,486, Response filed Sep. 10, 2024 to Final Office Action mailed Jun. 10, 2024", 11 pgs.
"U.S. Appl. No. 18/162,486, Response filed Nov. 21, 2023 to Final Office Action mailed Aug. 22, 2023", 15 pgs.

* cited by examiner

INTERLEAVED EXECUTION INFRASTRUCTURE IN DATABASE ENGINES

PRIORITY CLAIM

This application claims the benefit of priority to U.S. patent application Ser. No. 18/162,486, filed Jan. 31, 2023, the contents of which are hereby incorporated by reference in their entirety.

TECHNICAL FIELD

The present disclosure generally relates to data systems, such as data warehouses, and, more specifically, to interleaved compilation and execution infrastructure for database engines.

BACKGROUND

As the world becomes more data driven, database systems and other data systems are storing more and more data. For a business to use this data, different operations or queries are typically run on this large amount of data. Executing queries over large amounts of data can involve long processing times. Query compilation and query execution are typically distinct and static events, leading to inefficiencies.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for interleaved compilation and execution. Unlike conventional compile-then-execute workflows, the infrastructure described herein can interleave execution during compilation. For example, compilation can be paused, and a plan fragment is executed. The results of the plan fragment can be fed back into the compiler, which can then restart the compilation and modify the compilation based on the results of the plan fragment execution. The interleaved workflow provides a flexible, robust infrastructure, which can enable and improve a variety of database features and query optimizations.

Figure 1:
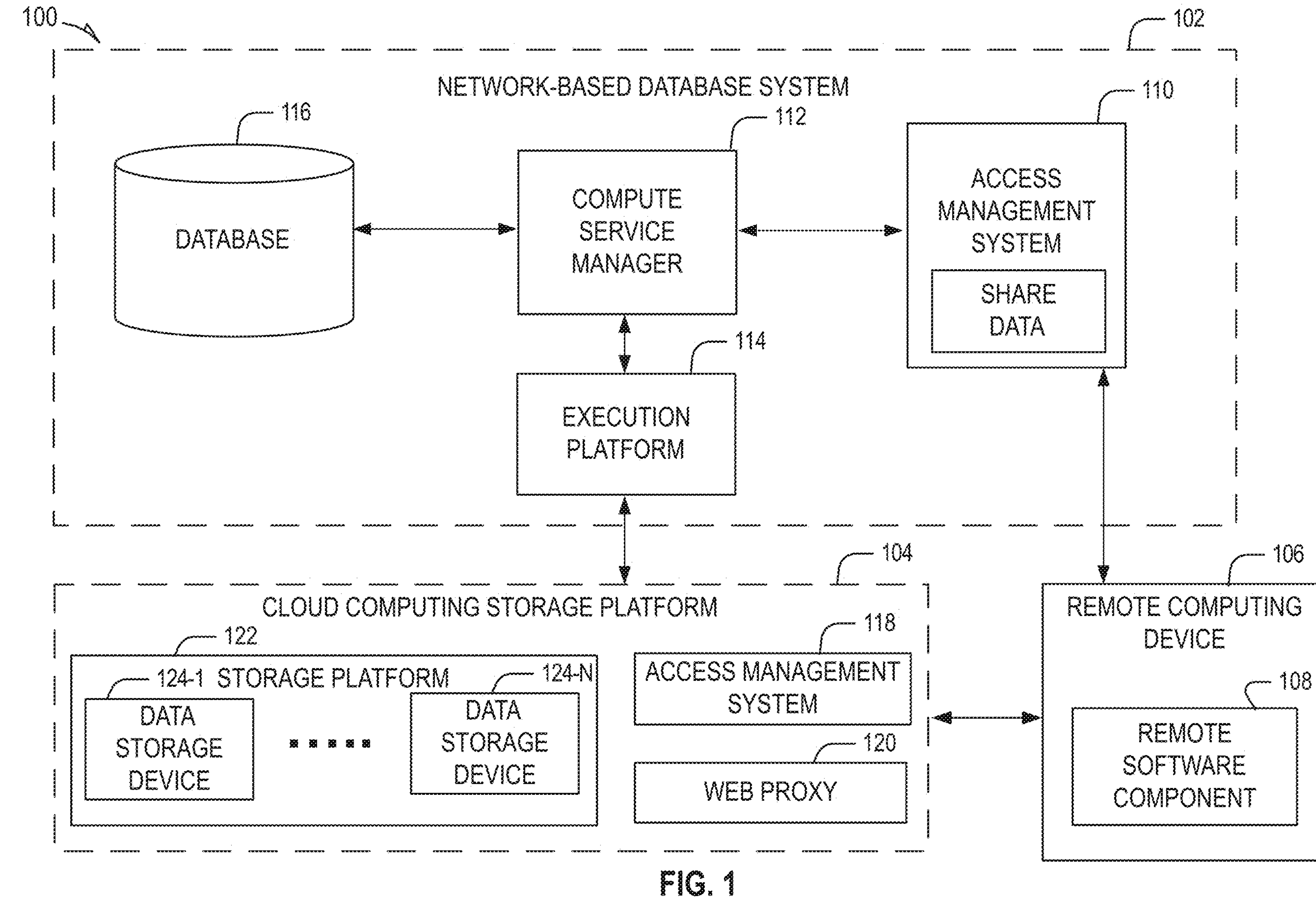
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment 106? may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
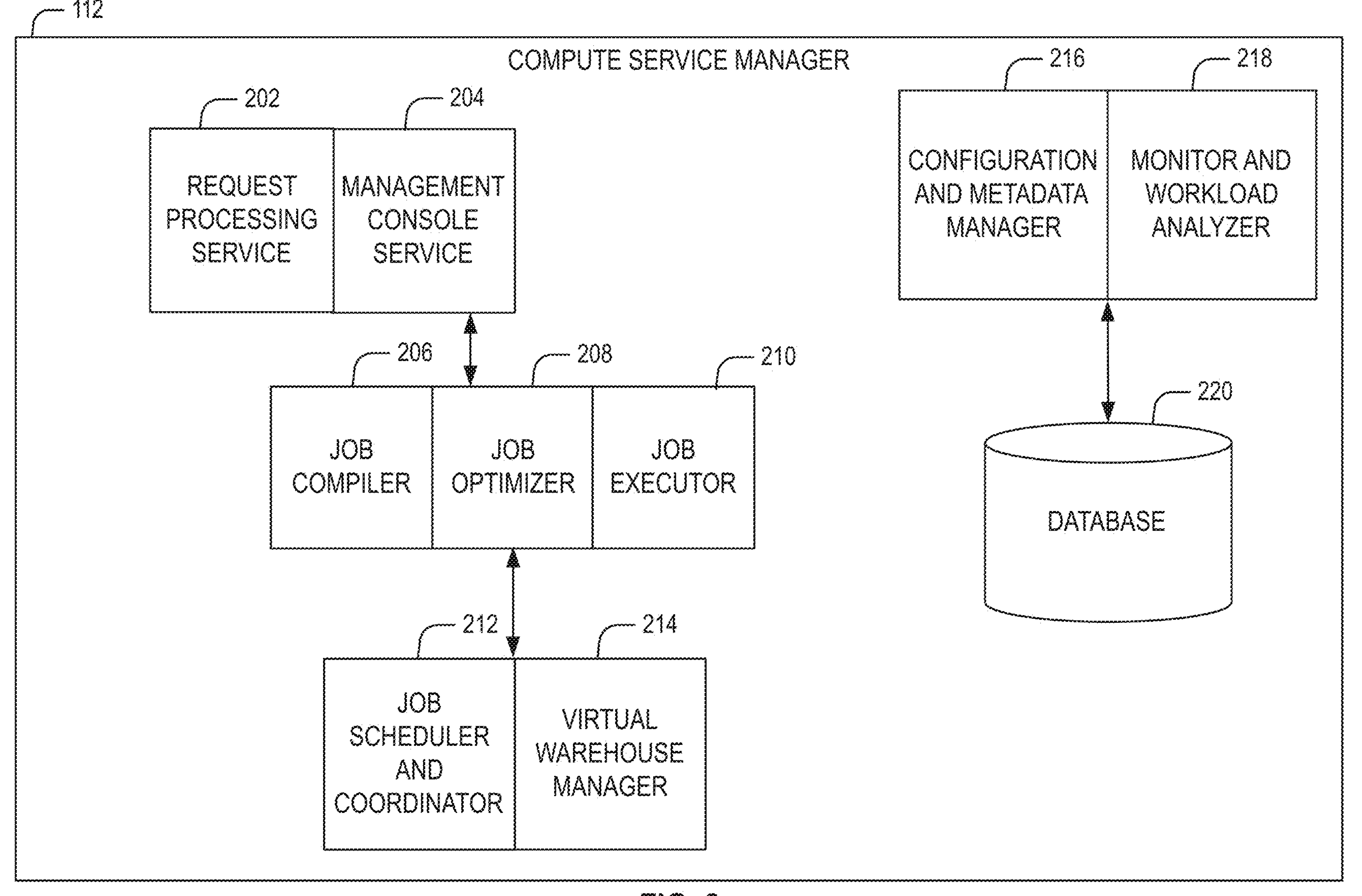
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based database system 102. For example, data storage device 220 may represent caches in execution platform 114, storage devices in cloud computing storage platform 104, or any other storage device.

Figure 3:
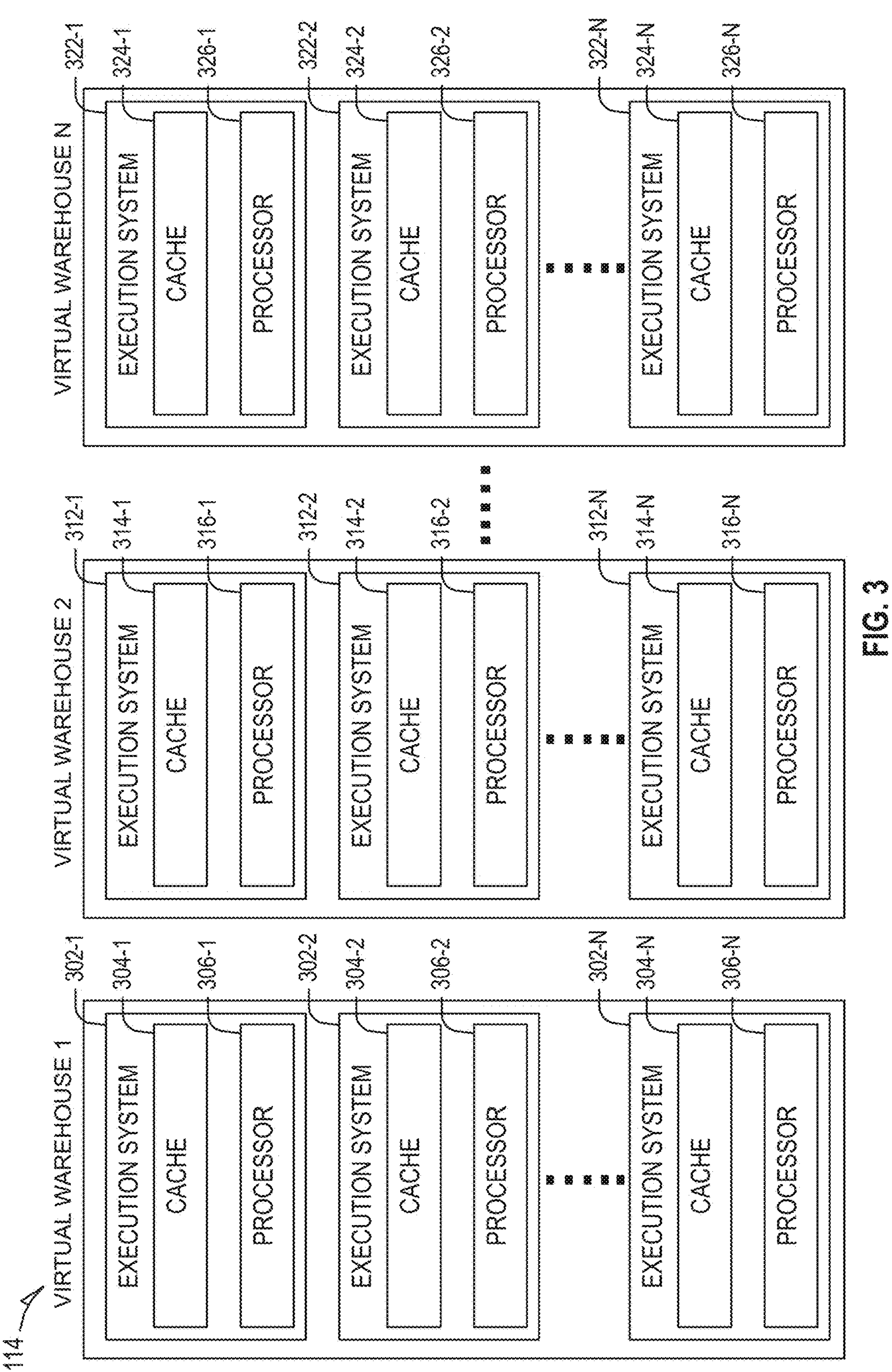
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse N. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Query compilation can include parsing, type check, optimization, and code generation. Query compilation typically involves receiving, by a compute service manager, a query, such as a SQL (Structured Query Language) statement, and generating a query execution plan, such as a SDL (Schema Definition Language) statement, which can then be executed by one or more servers on execution platforms (XPs). The query execution plan can include a representation of an execution graph where nodes describe operations for execution. To generate this form of a query execution plan, query compilation can include a plurality of stages and rewrite rules to produce optimized execution plans.

In conventional systems, a query engine typically follows a strict compile-then-execute workflow. For example, a query coordinator can first invoke a compiler to generate query plans needed for each step of execution of the query, and then the query coordinator proceeds to scheduling the query executions. This compile-then-execute workflow can have limitations. Query executions during compilation are not available and therefore the compiler does not have flexibility to retrieve information that can only be derived from execution that could assist in further optimizing the query plan. As another example, the query coordinator in a strict compile-then-execute workflow does not have the ability to start from an input other than a query text (e.g., SQL statement) such as a query plan fragment, which hampers the system's flexibility in terms of handling dynamic executions. Also, the rigid compile-then-execute workflow does not allow multiple compilation or execution steps in parallel. Moreover, the compile-then-execute workflow cannot re-compile and re-optimize query plans based on information gathered during execution.

Interleaved compilation and execution infrastructure described herein addresses these shortcomings of the strict compile-then-execute workflow. The interleaved infrastructure allows performance of parallel query executions during various stages of query compilation to dynamically retrieve information needed for subsequent steps of the compilation. For example, the interleaved infrastructure can execute a portion of a query plan and feed the results back to the compiler, which can then compile the remaining portions of the query plan based on the results. The interleaved execution infrastructure can also retrieve information, such as statistics and properties, which the compiler can use to optimize the compilation. The interleaved execution infrastructure can also re-compile query plans based on information, such as statistics, retrieved during execution of a compiled query plan to further optimize query plans after one or more execution steps have already started or retried.

Figure 4:
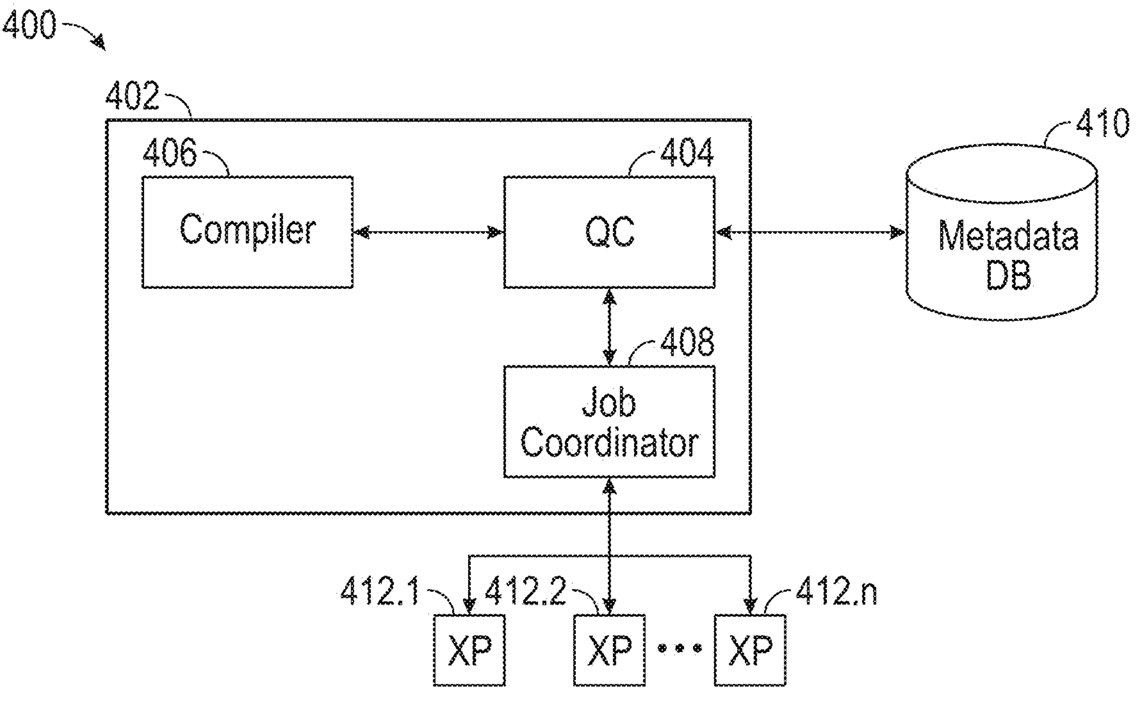
FIG. 4 is a simplified block diagram of an interleaved infrastructure, according to some example embodiments.

FIG. 4 is a simplified block diagram of an interleaved infrastructure 400, according to some example embodiments. The interleaved infrastructure 400 may include a compute service manager 402 to receive and process a query. The compute service manager 402 may be provided as described above with reference to FIGS. 1-3 (e.g., compute service manager 112). As relevant to interleaved query compilation and execution, the compute service manager 402 may include a query coordinator 404, a compiler 406, and a job coordinator 408 (also referred to as a job scheduler). In some embodiments, the components may be distributed across multiple compute service managers. For example, the query coordinator 404 and compiler may be provided in a first compute service manager, and the job coordinator may be provided in a second compute service manager.

The query coordinator 404 may orchestrate compilation and execution of queries. The query coordinator 404 may coordinate with the compiler 406 to perform interleaved compilation and execution. The query coordinator 404 may communicate with a metadata DB 410, which may store metadata. The metadata may include table properties, statistics (stats), and other information.

The query coordinator 404 may also coordinate with the job coordinator 408 to schedule jobs related to execution of queries (e.g., child jobs for recursive queries). The job coordinator 408 may schedule jobs with a plurality of execution platforms (XPs) 412.1-412.*n* to execute the assigned jobs. In some examples, the query coordinator 404 may receive results of jobs associated with parts of a query plan and send those results to the compiler 406, which may compile subsequent steps of the query plan based on the results, as described in further detail below. The job coordinator 408 may include a recursive job structure, which is able to recursively perform a job execution. In some examples, the job coordinator 408 may recursively execute a query plan or plan fragment (e.g., portion of a query plan).

In some examples, a snapshot of a fragment of a query plan may be taken, and the fragment of the query plan may be compiled and executed. In some examples, the fragment may be recursively executed until a time limit. In some embodiments, the compiler 406 may be multi-threaded. The compiler 406 may run the "main" compilation on a select thread. The results may be received by the compiler 406, which had paused the compilation of the remaining query plan. The compiler 406 may then start a new thread of compilation for the remaining query plan, which can be modified based on the results of the fragment.

Figure 5:
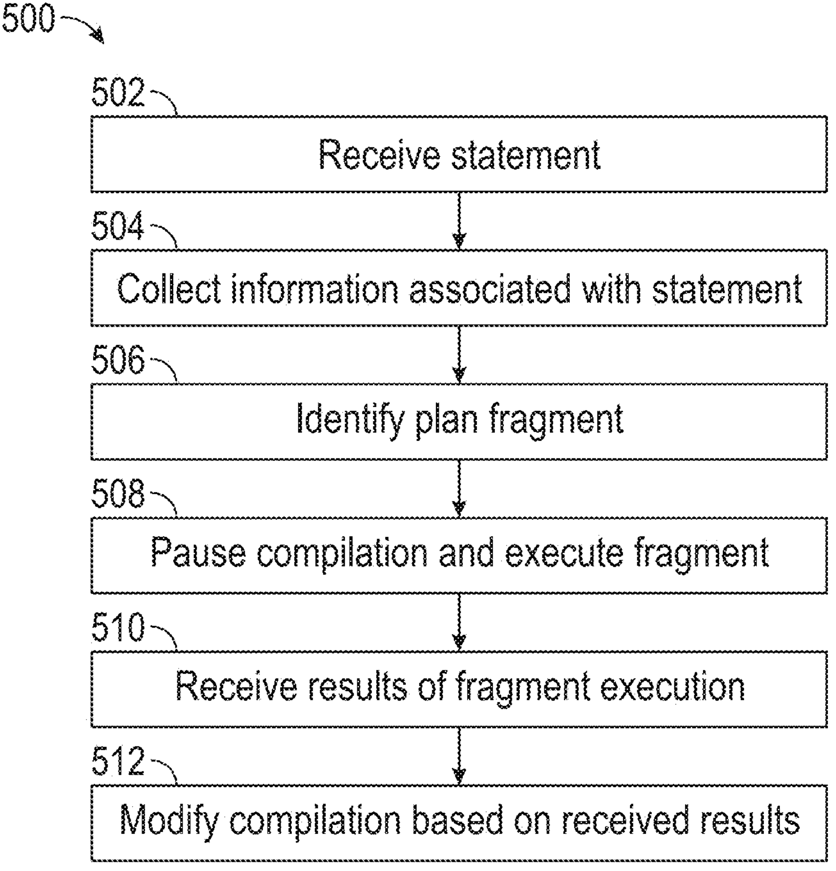
FIG. 5 illustrates a flow diagram of a method for interleaved compilation and execution, according to some example embodiments.

FIG. 5 illustrates a flow diagram of a method 500 for interleaved compilation and execution, according to some example embodiments. At operation 502, a statement to be executed is received by a compute service manager. The statement can be a query, DML statement, or the like.

At operation 504, a compiler in the compute service manager may collect information associated with the statement. For example, the compiler may create a collection, such as query type, feature set (e.g., external table reference, subquery nesting, user defined function (UDF) inclusion, types of table(s) indicated), and query plan properties. For example, as described in further detail below, an initial query plan may be generated and query plan properties may be collected by gathering a list of classes (e.g., SqlExpression classes) referenced in the query plan by traversing the nodes in the plan. SqlExpression includes a base call of expressions, which evaluate to a value in the parse tree and the query plan. These types of objects can be created during different steps of compilation.

At operation 506, a fragment of the query plan (e.g., portion of the query plan) may be identified for execution. The identified fragment may involve retrieving properties or statistics of a table associated with the query from a metadata DB, for example. The identified fragment may include retrieval of stats associated with the fragment of the query.

At operation 508, the compilation of the query plan may be paused and the fragment may be executed or processed (e.g., retrieval of stats). At operation 510, the results of the fragment execution or processing may be received. At operation 512, the compilation of the query plan may be re-started and modified based on the received fragment results.

This interleaved compilation and execution workflow may increase flexibility by performing compilation and execution in parallel. This interleaved workflow can optimize query execution and enable new capabilities where the compiler can leverage execution of fragments during compilation to deliver new functionalities.

Figure 6:
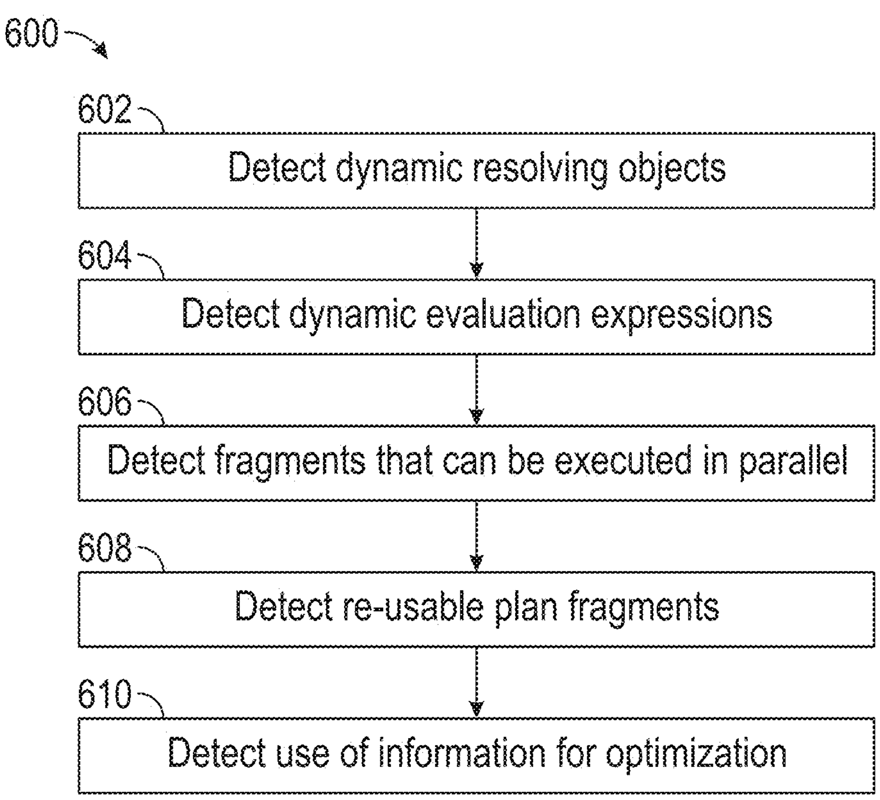
FIG. 6 shows a flow diagram for a method for identifying fragments for interleaved execution, according to some example embodiments.

The identification of fragments to process during compilation may be performed based on a set of rules. FIG. 6 shows a flow diagram for a method 600 for identifying fragments for interleaved execution, according to some example embodiments. At operation 602, the compiler may detect whether the query plan includes dynamic resolving objects (e.g., evaluating objects), such as macro expressions. For example, a query plan may reference a UDF, which is a type of macro expression. In these cases, the compiler may pause compilation and send the macro expression to be executed by one or more XPs (e.g., expand the definition of UDF). The results of executing the macro expression, such as generated definitions, may then be fed back into the compiler for compiling the subsequent steps of the query plan.

At operation 604, the compiler may detect whether the query plan includes dynamic evaluation expressions, such as constant subqueries and constant folding. Using interleaved execution, a compiler can initiate executions of constant subqueries during compilation and incorporate the results into subsequent stages of the compiler, e.g., pruning and cardinality estimation. The optimizer stage in the compiler can then generate query plans based on the subquery results. With interleaved execution, the compiler can identify constant expressions, evaluate the expression using XP execution, and then proceed with compilation based on the results of the evaluation.

At operation 606, the compiler may detect whether the query plan includes fragments that can be executed in parallel, such as parallel pruning. Some compilation stages can be expensive but parallelizable. For example, pruning operations on multiple target tables can be parallelized and overlapped with sampling queries to reduce the compilation time. Other aspects such as access path selection for independent plan fragments (e.g., with materialized view (MV) rewrites) can also be parallelized.

Also, some optimizations that are currently performed in the compiler that are not part of the "main" path of the query plan can be moved using the interleaved infrastructure. Examples include usage tracking optimizations performed at various stages of the compiler. These non-main path operations can be moved out of the main compilation thread and can be overlapped with other steps of compilation and execution in other threads.

At operation 608, the compiler may detect whether the query plan includes re-usable plan fragments. The re-usable plan fragments may be sent for execution by XPs and the results may be fed back into the compiler. In some examples, the re-usable plan fragments may be used for different queries.

At operation 610, the compiler may detect whether the query plan can use information for further optimization. For example, the compiler may pause compilation and may retrieve metadata information, such as statistics, sampling results, etc., and that information may be fed back into the compiler for compiling subsequent stages.

For example, one problem with strict compile-then execute workflow is inaccurate cardinality estimation. Using the interleaved execution infrastructure, the compiler can issue sampling queries to gather filter selectivity information that can be used as input to the optimizer to produce more efficient query plans. This may involve executing multiple sampling queries in parallel to avoid significant increase in compilation time. The query plans for the sampling queries can be directly generated from the plan fragments on top of the relevant table scans, and parallel executions can be kicked off from these plan fragments to retrieve the selectivity information. Workload optimization features, such as index searching, can also leverage interleaved execution to retrieve information that is fed into the compiler to improve workload performance.

The interleaved compilation and execution infrastructure described herein can be used in a variety of use cases. The infrastructure can be used to perform recursive queries. A recursive query can be a full-fledged SQL query that is executed during query compilation. In conventional systems, the compiler must have full knowledge of the SQL text and parse tree to operate. However, with the interleaved infrastructure, the compiler can kick off execution of a recursive query during compilation to retrieve query results that can be fed into subsequent query compilation processes.

Another use case that can leverage recursive queries to optimize query performance is memoizable functions, which can be used in row-level security (RLS) policies. For example, the compiler can detect the applicability of row-level policies with memoizable functions, and the compiler can initiate recursive executions of queries populated from the function definitions. After the recursive executions of queries are completed, the compiler can retrieve results of the recursive queries and substitute predicates in the original query with filters constructed from these results. The main goal is to convert RLS joins into filters in the compiler to simplify the original query and enable further query optimizations.

Interleaved compilation and execution infrastructure can be used to perform dynamic pivot/unpivot. Dynamic values can be provided in pivot clauses as well as supporting dynamic column lists in Unpivot clauses. With interleaved execution, the compiler can issue query executions to compute the required values/columns list, fetch the results to use in the pivot/unpivot clauses, and then proceed with the rest of the compilation using the results.

As mentioned above, there may be scenarios where the compilation stage that needs information from interleaved execution may not have access to the query text or parse tree or where the query plan is already known a priori. In such scenarios, the interleaved compilation and execution infrastructure may support executing plan fragments. For example, query execution speed can be increased by identifying plan fragments that can be accelerated through additional parallelism. Accelerated queries may maintain additional parallel plan fragment executions for each fragment-able part of the plan. These plan fragments are executed as separate child jobs that communicate with the parent job for the duration of the execution. These plan fragments are constructed towards the end of compilation where the compiler does not have access to the query text at that point; hence the infrastructure can initiate parallel recursive executions from the plan fragment (SDL) representation.

Common table expressions (CTEs) materialization can be improved using interleaved execution infrastructure. CTEs are constructs with analytical queries that could be referenced multiple times in subsequent sections of the query. In conventional systems, the CTE is executed once and the result of the execution is buffered. In these conventional systems, there is no mechanism to adjust the query plan after CTE execution, which can lead to suboptimal plans. With interleaved execution, CTE execution can be improved in multiple ways. The interleaved infrastructure can execute the CTE during compilation, collect execution stats such as CTE cardinality/cost, and resume compilation with the observed information. This allows the infrastructure to perform cost-based CTE materialization, and also helps improve query plan generation for plan fragments that remain on top of CTEs. Results of the CTE execution can also be shared across queries as well, since a very common pattern of interactive analytical query exploration involves reusing CTEs from previous queries in the same session.

Similar to CTE materialization, the compiler can identify other scenarios where the plan fragments are either shared or do not pose much additional materialization overhead, which can be executed in an interleaving pattern with compilation to produce more efficient query plans.

With interleaved executions, the compiler can also extend the scope of constant folding optimizations and improve the quality of the produced plans. Similar to constant subqueries described above, constant folding can also be improved. In conventional systems, the compiler performs constant folding through a set of function specializations in range derivation, which operates on either constant arguments or Expression Properties min/max values after pruning optimizations. This oftentimes results in low optimization, because of the limitation of range derivation specializations for functions in the compiler especially when it comes to complex expression evaluations, such as variant operations or Geo expressions. As a result, there are cases where the compiler cannot perform constant-fold expressions, resulting in missed query optimization opportunities.

With interleaved execution, the compiler can identify constant expressions that it cannot handle and evaluate the expression in an XP. From the compiler's perspective, the result is a similar constant folding process, except that the constant folding is performed on an XP.

Compilation can be dynamically changed based on the interleaved execution results. For example, dynamic interleaved execution can add compilation and/or execution steps that are identified dynamically during query execution using the techniques described herein. The compiler can replace existing plans with new query plans or generate plans for new execution steps dynamically. For example, schema mismatch can be detected during query execution, and the compiler may adjust the query plan to evolve the schema in a source table based on the detected schema of underlying files to be copied and then resume the copy execution with the updated schema.

The interleaved execution infrastructure can also be used in conjunction with XP retries and re-compilation. The interleaved execution infrastructure can detect an XP retry and can change the compilation instead of simply re-executing the same SDL by the XP. For example, the compiler can re-compile to generate more efficient query plans based on information collected in the first XP execution. Also, the system can dynamically abort XP executions if the system detects poor performance of the XP execution, which could lead to latency issues, and then re-compile to generate better performing query plans.

As mentioned above, the interleaved execution infrastructure can initiate recursive jobs to coordinate dynamic execution during compilation. In strict compile-then-execute workflows, jobs are typically created from string representations of SQL texts. However, for various use cases described above, interleaved execution involves initiating jobs from plan fragments. Hence, a job coordinator (e.g., job coordinator 408) includes the capability to create jobs from intermediate representations of the output of the compiler. The intermediate outputs from the compiler may include SDLs and other information (e.g., scansets, keys) to initiate the recursive executions.

These recursive jobs may be managed so that parent and child jobs are associated. Changes in a parent job are propagated to child jobs and vice versa. The jobs may also be managed for load balancing and retries. Job flow management may be implemented to manage the recursive jobs. For example, the management may include triggering sequential executions or recursive jobs to fetch information for the original "main" compilation, triggering parallel executions or recursive jobs during the "main" compilation, overlapping the sequential or parallel executions with one or more compilation stages (or parallel compilation stages), and dynamically triggering re-compilation and executions for multiple rounds.

Recursive child jobs can be used to perform interleaved execution. A jobs layer provides a number of interfaces for managing child jobs, including creation, scheduling as well as messaging with child jobs.

A set of application programming interfaces (APIs) can be implemented in the query layer for interacting with the job layer, in particular child job infrastructure. This set of APIs allow components in the query layer, such as the compiler, to initiate execution of plan fragments during compilation as described above. In some embodiments, the set of APIs can be implemented as standalone components outside of the query coordinator. Hence, the APIs can be invoked by the query coordinator, compiler, and execution related components to perform recursive operations.

The query layer can evaluate recursive queries as a function call during query compilation. The query layer components wait for the recursive query to finish and retrieve the result of the recursive query as a return value of the function that can be seamlessly embedded as an input to the rest of the compilation (e.g., memoizable function, dynamic pivot, constant folding).

The query layer can also initiate multiple asynchronous recursive queries. Query layer components (e.g., compiler, query coordinator) can manage the workflow of asynchronous recursive queries with the ability to manage overlapping queries (e.g., query acceleration, optimizer stats queries, evaluating CTEs).

The query layer can leverage result reuse in recursive queries (e.g., memoizable function, evaluating CTEs). The query layer can collect stats from recursive queries (e.g., stat queries). The query layer can manage interleaved execution performance, such as implementing a time-out or aborting of executing recursive queries.

The job layer can create child jobs to represent recursive queries. Job layer components (e.g., job coordinator) can create child jobs with load balancing, such as the ability to perform retries of child jobs. The job layer can associate a child job to particular execution components (e.g., compute service manager) with components used for parent job execution. The job layer can return results of the child job to the parent job and can leverage result reuse in child jobs. The job layer can also send and receive messages between the parent and child jobs (e.g., retrieve status of currently executing child jobs, retrieve execution stats from child jobs). The job layer can initiate and maintain multiple child jobs from the same parent job at the same time.

Figure 7:
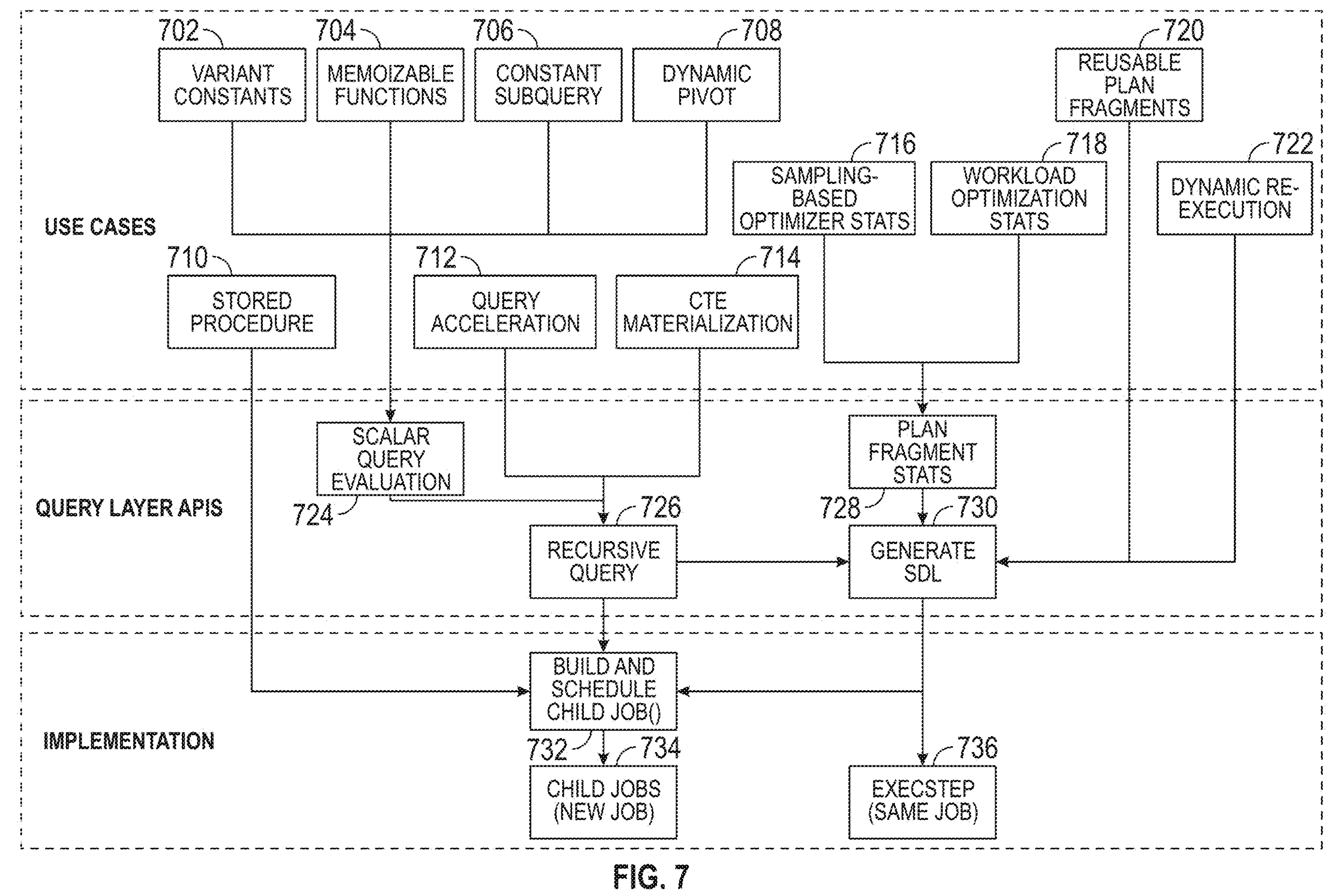
FIG. 7 illustrates a framework of interleaved execution for select use cases, according to some example embodiments.

FIG. 7 illustrates a framework of interleaved execution for select use cases, according to some example embodiments. The use cases can include variant constraints 702, memoizable functions 704, constant subquery 706, dynamic pivot 708, stored procedure 710, query acceleration 712, CTE materialization 714, sampling-based optimizer stats 716, workload optimization stats 718, reusable plan fragments 720, and dynamic re-execution 722 as described above. Query layer APIs can be organized based on different concepts associated with the use cases. The APIs can include scalar query evaluation API 724, recursive query API 726, plan fragment stats API 728, and generate SDL API 730. The implementation in the job layer can include functions such as build and schedule child job 732, child jobs (new job) 734, and execution step (same job) 736.

The recursive query API 726 is provided within the query layer and can perform operations through recursive statements. These operations include those operations that involve additional parsing and compilation, or query executions that involve different plans from a current plan under compilation. Recursive queries could involve recursive compilation and recursive executions and may involve the creation of child jobs (or execution of the same job). Recursive queries can be created via the recursive query API 726 from the query text or from intermediate representations of query plans, such as a query plan node tree, which can be distinguished through different APIs. A recursive query could be issued synchronously or asynchronously from query compilation or other locations, such as the query coordinator, and provides the functionality to retrieve results, check status, and perform lifecycle management including aborting and timeouts. The recursive query API 726 also serves as a building block for other APIs on top, such as scalar query evaluation API 724.

Figure 8:
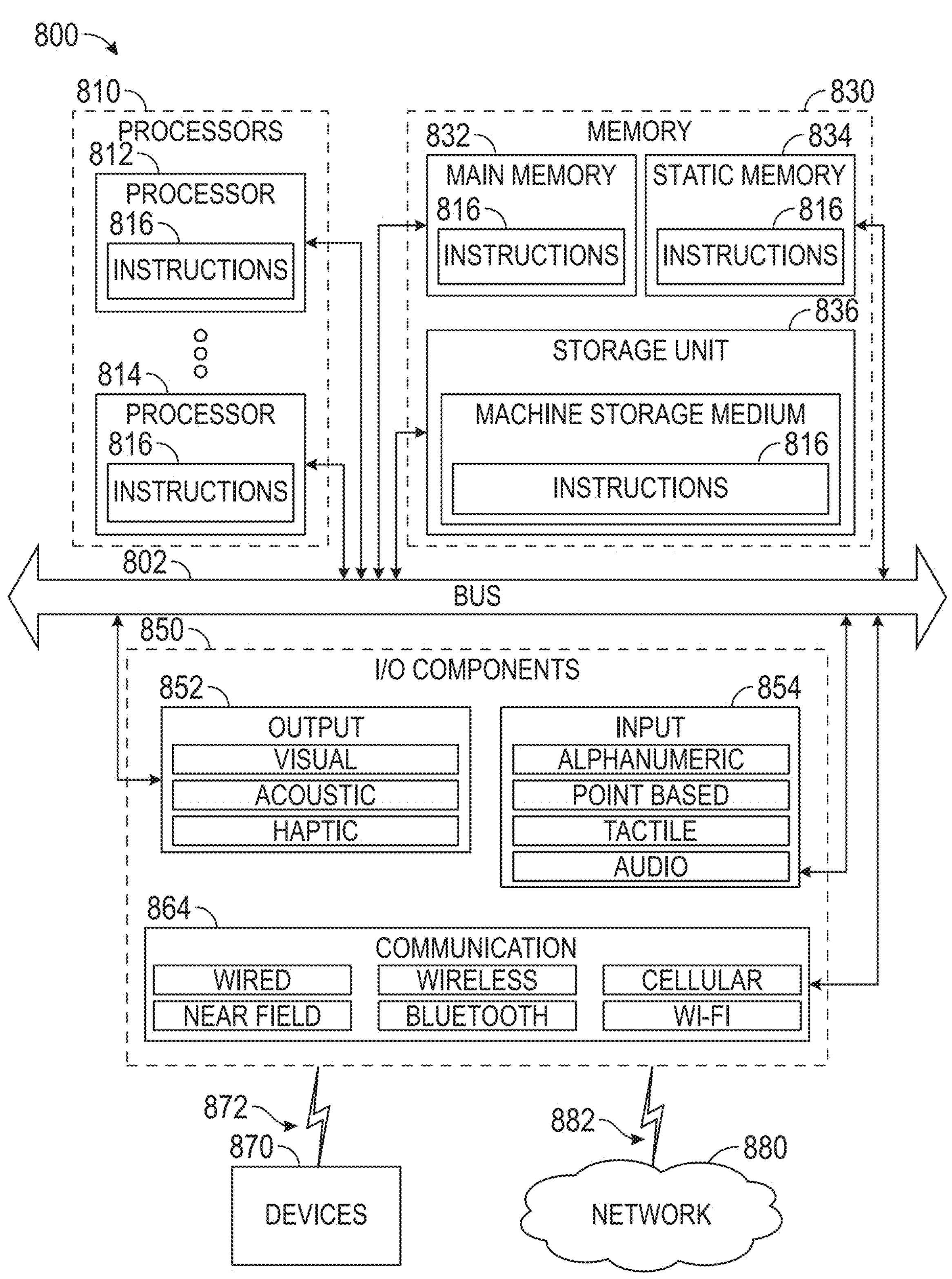
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., the remote computing device 106, the access management system 118, the compute service manager 112, the execution platform 114, the access management system 110, the Web proxy 120) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 118, the compute service manager 112, the execution platform 114, the access management system 110, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving a query; initiating, by at least one hardware processor, compilation of a query plan based on the query; identifying a plan fragment of the query plan for interleaved execution; pausing compilation of the query plan; executing the plan fragment while the compilation of the query plan is paused; receiving results of executing the plan fragment; and resuming the compilation of the query plan, the resuming of the compilation including modifying the compilation based on the received results.

Example 2. The method of example 1, wherein identifying the plan fragment includes detecting a dynamic resolving object in the query plan.

Example 3. The method of any of examples 1-2, wherein the dynamic resolving object includes a macro expression.

Example 4. The method of any of examples 1-3, wherein identifying the plan fragment includes detecting a dynamic evaluation expression.

Example 5. The method of any of examples 1-4, wherein the dynamic evaluation expression includes a constant subquery.

Example 6. The method of any of examples 1-5, wherein identifying the plan fragment includes detecting that the plan fragment is eligible for parallel execution.

Example 7. The method of any of examples 1-6, wherein the parallel execution includes parallel pruning.

Example 8. The method of any of examples 1-7, wherein identifying the plan fragment includes detecting use of information for optimizing the query plan.

Example 9. The method of any of examples 1-8, further comprising: executing a plurality of sampling queries based on the plan fragment; and retrieving statistics based on executing the plurality of sampling queries Example 10. The method of any of examples 1-9, wherein executing the plan fragment includes executing a recursive query based on the plan fragment.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

What is claimed is:

1. A system comprising:

at least one hardware processor; and at least one memory storing instructions that, when executed by the at least one hardware processor, cause the at least one hardware processor to perform operations comprising:

receiving, by a network-based data system, a query;

generating, by at least one server in the network-based data system, a query plan to execute the query;

detecting a plan fragment of the query plan for early execution, the plan fragment comprising a dynamic resolving object, the dynamic resolving object comprising a macro expression;

pausing compilation of the query plan based on detecting the plan fragment;

assigning, by the at least one server, the plan fragment to one or more execution platforms in the network-based data system for execution;

executing, by one or more execution platforms in the network-based data system, the plan fragment while the compilation of the query plan is paused, the executing comprising:

expanding a definition of a user defined function (UDF) in the plan fragment;

executing the macro expression based on the expanded definition; and generating results based on executing the macro expression, the results comprising at least one generated definition of the UDF;

receiving, by the at least one server, results of executing the plan fragment from the one or more execution platforms;

modifying, by the at least one server, the compilation of the query plan based on the results; and completing compilation of the query plan.

2. The system of claim 1, wherein the plan fragment further comprises a dynamic evaluation expression.

3. The system of claim 2, wherein the dynamic evaluation expression comprises a constant subquery.

4. The system of claim 1, the operations further comprising:

collecting query plan properties of the query plan, comprising a list of classes referenced in the query plan;

wherein detecting the plan fragment is based on the query plan properties.

5. The system of claim 1, wherein executing the plan fragment comprises executing a recursive query based on the plan fragment.

6. A method comprising:

receiving, by a network-based data system, a query;

generating, by at least one server in the network-based data system, a query plan to execute the query;

detecting a plan fragment of the query plan for early execution, the plan fragment comprising a dynamic resolving object, the dynamic resolving object comprising a macro expression;

pausing compilation of the query plan based on detecting the plan fragment;

assigning, by the at least one server, the plan fragment to one or more execution platforms in the network-based data system for execution;

executing, by one or more execution platforms in the network-based data system, the plan fragment while the compilation of the query plan is paused, the executing comprising:

expanding a definition of a user defined function (UDF) in the plan fragment;

executing the macro expression based on the expanded definition; and generating results based on executing the macro expression, the results comprising at least one generated definition of the UDF;

receiving, by the at least one server, results of executing the plan fragment from the one or more execution platforms;

modifying, by the at least one server, the compilation of the query plan based on the results; and completing compilation of the query plan.

7. The method of claim 6, wherein the plan fragment further comprises a dynamic evaluation expression.

8. The method of claim 7, wherein the dynamic evaluation expression comprises a constant subquery.

9. The method of claim 6, further comprising:

collecting query plan properties of the query plan, comprising a list of classes referenced in the query plan;

wherein detecting the plan fragment is based on the query plan properties.

10. The method of claim 6, wherein executing the plan fragment comprises executing a recursive query based on the plan fragment.

11. A machine-storage medium embodying instructions that, when executed by a machine, cause the machine to perform operations comprising:

receiving, by a network-based data system, a query;

generating, by at least one server in the network-based data system, a query plan to execute the query;

detecting a plan fragment of the query plan for early execution, the plan fragment comprising a dynamic resolving object, the dynamic resolving object comprising a macro expression;

pausing compilation of the query plan based on detecting the plan fragment;

assigning, by the at least one server, the plan fragment to one or more execution platforms in the network-based data system for execution;

executing, by one or more execution platforms in the network-based data system, the plan fragment while the compilation of the query plan is paused, the executing comprising:

expanding a definition of a user defined function (UDF) in the plan fragment;

executing the macro expression based on the expanded definition; and generating results based on executing the macro expression, the results comprising at least one generated definition of the UDF;

receiving, by the at least one server, results of executing the plan fragment from the one or more execution platforms;

modifying, by the at least one server, the compilation of the query plan based on the results; and completing compilation of the query plan.

12. The machine-storage medium of claim 11, wherein the plan fragment further comprises a dynamic evaluation expression.

13. The machine-storage medium of claim 12, wherein the dynamic evaluation expression comprises a constant subquery.

14. The machine-storage medium of claim 11, the operations further comprising:

collecting query plan properties of the query plan, comprising a list of classes referenced in the query plan;

wherein detecting the plan fragment is based on the query plan properties.

* * * * *